United States Patent
Konishi et al.

(10) Patent No.: US 9,778,138 B2
(45) Date of Patent: Oct. 3, 2017

(54) METHOD FOR MEASURING LIGHT PHYSICAL CONSTANTS AND DEVICE FOR ESTIMATING LIGHT PHYSICAL CONSTANTS

(71) Applicant: OSAKA UNIVERSITY, Osaka (JP)

(72) Inventors: Tsuyoshi Konishi, Osaka (JP); Koji Takahashi, Osaka (JP); Kentaro Kawanishi, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 43 days.

(21) Appl. No.: 14/761,955

(22) PCT Filed: Dec. 24, 2013

(86) PCT No.: PCT/JP2013/007547
§ 371 (c)(1),
(2) Date: Jul. 20, 2015

(87) PCT Pub. No.: WO2014/112020
PCT Pub. Date: Jul. 24, 2014

(65) Prior Publication Data
US 2015/0362404 A1    Dec. 17, 2015

(30) Foreign Application Priority Data
Jan. 21, 2013 (JP) ................. 2013-008372

(51) Int. Cl.
*G01N 21/00* (2006.01)
*G01M 11/00* (2006.01)

(52) U.S. Cl.
CPC ...... *G01M 11/338* (2013.01); *G01M 11/3145* (2013.01); *G01M 11/33* (2013.01); *G01M 11/333* (2013.01)

(58) Field of Classification Search
CPC ......... H04B 10/08; H04B 10/12; H04J 14/02; G01M 11/00; G01M 11/338; G01M 11/333
See application file for complete search history.

(56) References Cited

U.S. PATENT DOCUMENTS

| 5,661,554 | A  | 8/1997 | Calvani et al. |
| 6,771,360 | B2 | 8/2004 | Kawabata |

(Continued)

FOREIGN PATENT DOCUMENTS

| EP | 2 323 286  | 5/2011  |
| JP | 06-341924  | 12/1994 |

(Continued)

OTHER PUBLICATIONS

Extended European Search Report issued Jul. 27, 2016 in European Application No. 13871806.9.

(Continued)

*Primary Examiner* — Jamil Ahmed
(74) *Attorney, Agent, or Firm* — Wenderoth, Lind & Ponack, L.L.P.

(57) ABSTRACT

A light physical constant measurement method includes: virtually dividing an optical transmission medium along a propagation direction to set a plurality of first segments; and estimating light physical constants of the plurality of first segments based on the result of a first propagation simulation that uses a model in which an input optical signal of each of the plurality of intensities propagates sequentially through the plurality of first segments, and in the estimating of light physical constants of the plurality of first segments, the light physical constants of the plurality of first segments are searched for using an evaluation function of evaluating a difference between a measured power spectrum of an output optical signal and a power spectrum of the output optical signal obtained as a result of the first propagation (Continued)

simulation, to estimate the light physical constants of the plurality of first segments.

7 Claims, 11 Drawing Sheets

(56) References Cited

U.S. PATENT DOCUMENTS

| | | |
|---|---|---|
| 6,909,496 B2 | 6/2005 | Mori |
| 8,886,037 B2 | 11/2014 | Konishi et al. |
| 2003/0137652 A1 | 7/2003 | Mori |
| 2003/0137653 A1 | 7/2003 | Kawabata |
| 2011/0110659 A1* | 5/2011 | Eiselt .................. H04B 10/071 398/28 |
| 2011/0311223 A1* | 12/2011 | Konishi .................. G01J 3/02 398/38 |

FOREIGN PATENT DOCUMENTS

| | | |
|---|---|---|
| JP | 08-285728 | 11/1996 |
| JP | 08-334435 | 12/1996 |
| JP | 2003-065899 | 3/2003 |
| JP | 2003-166904 | 6/2003 |
| JP | 2003-254863 | 9/2003 |
| JP | 2006-112926 | 4/2006 |
| JP | 2007-327861 | 12/2007 |
| JP | 2010-204308 | 9/2010 |
| JP | 2011-013234 | 1/2011 |

OTHER PUBLICATIONS

International Search Report issued Apr. 22, 2014 in International (PCT) Application No. PCT/JP2013/007547.
Tako, T. and Honda, T., "Opto-Electronic Measuring Instruments Guide for User Engineers", 1999. The Optronics Co., Ltd., pp. 102-115 (with English translation).

* cited by examiner

|  | First optical fiber (0 ~ 5 m) | Second optical fiber (5 ~ 10 m) |
|---|---|---|
| D [ps/nm/km] | 7.0 | 1.0 |
| SI [ps/nm²/km] | 0.03 | 0.01 |
| γ [/W/km] | 10 | 15 |
| L [m] | 5 | 5 |

|  | 0.0 ~ 2.5 m | 2.5 ~ 5.0 m | 5.0 ~ 7.5 m | 7.5 ~ 10 m |
|---|---|---|---|---|
| D [ps/nm/km] | 6.8741 | 7.6204 | 0.5234 | 1.0185 |
| Sl [ps/nm$^2$/km] | 0.0125 | 0.00361 | 0.0516 | 0.0009 |
| γ [/W/km] | 12.2 | 11.5 | 15.2 | 14.5 |

METHOD FOR MEASURING LIGHT PHYSICAL CONSTANTS AND DEVICE FOR ESTIMATING LIGHT PHYSICAL CONSTANTS

TECHNICAL FIELD

The present invention relates to a method for estimating distribution of light physical constants within an optical transmission medium.

BACKGROUND ART

In the optical communication field, a light physical constant (for example, a nonlinear optical constant, a dispersion parameter, or the like) of an optical transmission medium has an impact on transmission characteristics of optical signals. Under such circumstances, a method for measuring a light physical constant of an optical transmission medium has been proposed (see Non Patent Literature (NPL) 1, for example).

CITATION LIST

Non Patent Literature

[NPL 1]
Tako, T. and Honda, T. 1999. Opto-electronic measuring instruments guide for user engineers. Pp. 102-126. The Optronics Co., Ltd.

SUMMARY OF INVENTION

Technical Problem

However, in the above conventional method, a light physical constant is measured assuming that the light physical constant is the same throughout the interior of an optical transmission medium, and a light physical constant that is dependent on its position within the optical transmission medium—that is, distribution of light physical constants—is difficult to obtain.

In view of this, the present invention provides a light physical constant measurement method by which distribution of light physical constants within an optical transmission medium can be measured.

Solution to Problem

A light physical constant measurement method according to an aspect of the present invention is a light physical constant measurement method for measuring distribution of light physical constants within an optical transmission medium and includes: obtaining information indicating a power spectrum and a phase spectrum of an input optical signal of a plurality of intensities; measuring, for each of the plurality of intensities of the input optical signal, a power spectrum of an output optical signal that is output after the input optical signal of the intensity propagates within the optical transmission medium; virtually dividing the optical transmission medium along a propagation direction to set a plurality of first segments; estimating light physical constants of the plurality of first segments based on a result of a first propagation simulation that uses a model in which the input optical signal of each of the plurality of intensities propagates sequentially through the plurality of first segments; and outputting the estimated light physical constants of the plurality of first segments as the distribution of the light physical constants within the optical transmission medium, wherein the first propagation simulation requires, as input, the obtained information indicating the power spectrum and the phase spectrum of the input optical signal of the plurality of intensities, and light physical constants of the plurality of first segments, and outputs a power spectrum of the output optical signal as a simulation result, and in the estimating of light physical constants of the plurality of first segments, the light physical constants of the plurality of first segments are searched for using an evaluation function of evaluating a difference between the measured power spectrum of the output optical signal and the power spectrum of the output optical signal obtained as a result of the first propagation simulation, to estimate the light physical constants of the plurality of first segments.

Accordingly, it is possible to estimate distribution, in a propagation direction, of light physical constants within an optical transmission medium using a power spectrum of an output optical signal corresponding to an input optical signal of a plurality of intensities. Therefore, it is not necessary to use a special device to obtain distribution, in a propagation direction, of light physical constants within an optical transmission medium. This means that with a simple, easy-to-use system (for example, a system including a variable optical attenuator and a spectroscope), it is possible to obtain distribution, in a propagation direction, of light physical constants within an optical transmission medium.

For example, the light physical constant measurement method may further include: integrating adjacent first segments included in the plurality of first segments, based on the estimated light physical constants of the plurality of first segments, to set a plurality of second segments; and estimating light physical constants of the plurality of second segments based on a result of a second propagation simulation that uses a model in which the input optical signal of each of the plurality of intensities propagates sequentially through the plurality of second segments. The second propagation simulation may require, as input, the obtained information indicating the power spectrum and the phase spectrum of the input optical signal of the plurality of intensities, and light physical constants of the plurality of second segments, and outputs a power spectrum of the output optical signal as a simulation result. In the estimating of light physical constants of the plurality of second segments, the light physical constants of the plurality of second segments may be searched for using an evaluation function of evaluating a difference between the measured power spectrum of the output optical signal and the power spectrum of the output optical signal obtained as a result of the second propagation simulation, to estimate the light physical constants of the plurality of second segments. In the outputting, instead of the estimated light physical constants of the plurality of first segments, the estimated light physical constants of the plurality of second segments may be output as the distribution of the light physical constants within the optical transmission medium.

Accordingly, it is possible to search for distribution of light physical constants within an optical transmission medium using a plurality of second segments obtained by integrating first segments. Therefore, a position at which the light physical constant changes in the optical transmission medium can be appropriately set according to the result of the first propagation simulation, so that the accuracy of estimating distribution of light physical constants can be enhanced. Furthermore, the plurality of segments (the first segments) that are estimated to have a uniform light physical constant are integrated into one segment (the second segment) for use in a propagation simulation, and therefore it is possible to lessen processing time or a processing load in a propagation simulation. For example, a condition to terminate the search in the second propagation simulation can be set to be more stringent than a condition to terminate the search in the first propagation simulation so that the first propagation simulation, in which the processing load is high due to the fact of having a large number of segments, is performed less frequently.

For example, in the integrating, whether or not light physical constants of the adjacent first segments included in the plurality of first segments are similar may be determined, and the adjacent first segments may be integrated when it is determined that the light physical constants of the adjacent first segments are similar.

Accordingly, the first segments similar to each other can be integrated, with the result that the plurality of second segments can more appropriately be set.

For example, in the estimating of light physical constants of the plurality of second segments, initial values of the light physical constants of the plurality of second segments which are provided as the input to the second propagation simulation may be set using the estimated light physical constants of the plurality of first segments.

Accordingly, it is possible to set the initial values of the light physical constants of the plurality of second segments using the light physical constants of the plurality of first segments. Accordingly, a decrease in the evaluation function (an increase in the difference between a measured power spectrum and a calculated power spectrum) at the time of starting the search in the second propagation simulation can be reduced so that the processing time or the processing load can be lessened.

For example, the optical transmission medium may be an optical fiber.

Thus, distribution of light physical constants of an optical fiber can be measured.

For example, the light physical constant may include a dispersion parameter and a nonlinear optical constant, and in the first propagation simulation, optical signal propagation calculation using the dispersion parameter and optical signal propagation calculation using the nonlinear optical constant may be sequentially performed for each of the plurality of first segments.

Thus, optical signal propagation calculation using a dispersion parameter and optical signal propagation calculation using a nonlinear optical constant are sequentially performed to enable simulation of propagation of an input optical signal. Accordingly, there is no need to simultaneously perform the optical signal propagation calculation using a dispersion parameter and the optical signal propagation calculation using a nonlinear optical constant, and therefore it is possible to facilitate the propagation simulation.

It should be noted that these general and specific aspects may be implemented using a device, a system, an integrated circuit, a computer program, a computer-readable recording medium such as a CD-ROM, or any combination of devices, systems, integrated circuits, computer programs, or recording media.

Advantageous Effects of Invention

Distribution of light physical constants within an optical transmission medium can be estimated by the light physical constant measurement method according to an aspect of the present invention.

DESCRIPTION OF EMBODIMENTS

The following describes embodiments with reference to the drawings.

The embodiments described below each show a general or specific example. The numerical values, shapes, materials, constituent elements, the arrangement and connection of the constituent elements, steps, the processing order of the steps, and the like shown in the following embodiments are mere examples, and thus are not intended to limit the scope of the claims. Therefore, among the constituent elements in the following exemplary embodiments, constituent elements not recited in any of the independent claims defining the most generic part of the inventive concept are described as arbitrary constituent elements.

Embodiment 1

Configuration of System for Measuring Light Physical Constants

Figure 1:
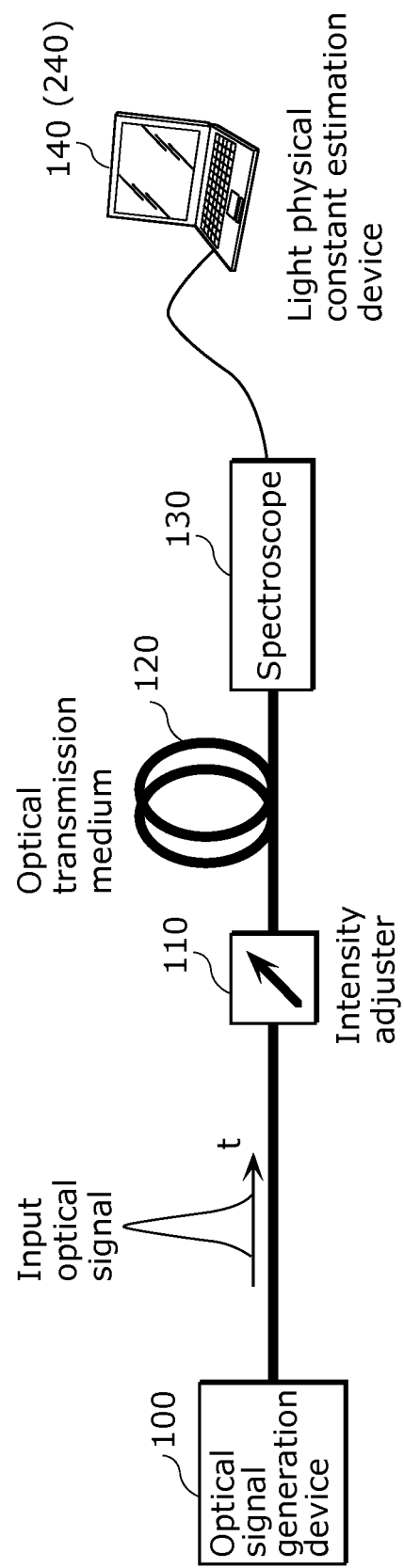
FIG. 1 illustrates a hardware configuration of a system for measuring light physical constants according to Embodiment 1.

FIG. 1 illustrates a hardware configuration of a system for measuring light physical constants according to Embodiment 1. This system for measuring light physical constants measures a power spectrum of an output optical signal, and estimates distribution of light physical constants within an optical transmission medium 120 using the measured power spectrum.

The light physical constant is a value indicating characteristics of interaction between electromagnetic waves and substances. The light physical constant includes a nonlinear optical constant and a dispersion parameter. The nonlinear optical constant and the dispersion parameter will be described later.

The optical transmission medium 120 propagates an optical signal and is, for example, an optical fiber. Distribution, in the light propagation direction, of light physical constants within this optical transmission medium 120 is estimated by the system for measuring light physical constants. Specifically, the optical transmission medium 120 is, for example, a photonic crystal fiber. Since it is difficult to manufacture a photonic crystal having a spatially uniform structure, the distribution of light physical constants within the optical transmission medium including a photonic crystal is likely to be non-uniform. It should be noted that the optical transmission medium 120 does not need to include a photonic crystal and may be made of any material. The optical transmission medium 120 does not need to be an optical fiber. For example, the optical transmission medium 120 may be a photonic crystal device.

As illustrated in FIG. 1, the system for measuring light physical constants includes an optical signal generation device 100, an intensity adjuster 110, a spectroscope 130, and a light physical constant estimation device 140.

The optical signal generation device 100 generates an input optical signal. Specifically, the optical signal generation device 100 includes, for example, a mode-locked laser diode (MLLD), a single mode fiber (SMF), and an erbium doped fiber amplifier (EDFA). In the optical signal generation device 100, an optical pulse output from the MLLD undergoes dispersion compensation by the SMF and amplification by the EDFA. Herein, short-pulse light with a pulse width of 100 ps or less is generated as an input optical signal.

A power spectrum and a phase spectrum of the input optical signal generated by the optical signal generation device 100 are known. This means that a time waveform of the input optical signal is known herein. An autocorrelation function of the input optical signal may be known instead of the power spectrum of the input optical signal.

The intensity adjuster 110 changes the intensity of the input optical signal generated by the optical signal generation device 100.

The spectroscope 130 is an example of a spectrum measuring device, resolves an output optical signal into light beams of respective wavelengths, and performs optical-to-electrical (O-to-E) conversion and analog-to-digital (A-to-D) conversion on the light beams of the respective wavelengths, thus generating a power spectrum expressed by digital values. Thus, the spectroscope 130 measures a power spectrum of an output optical signal. Here, the output optical signal is an optical signal that is output after an input optical signal propagates within the optical transmission medium 120.

Figure 12:
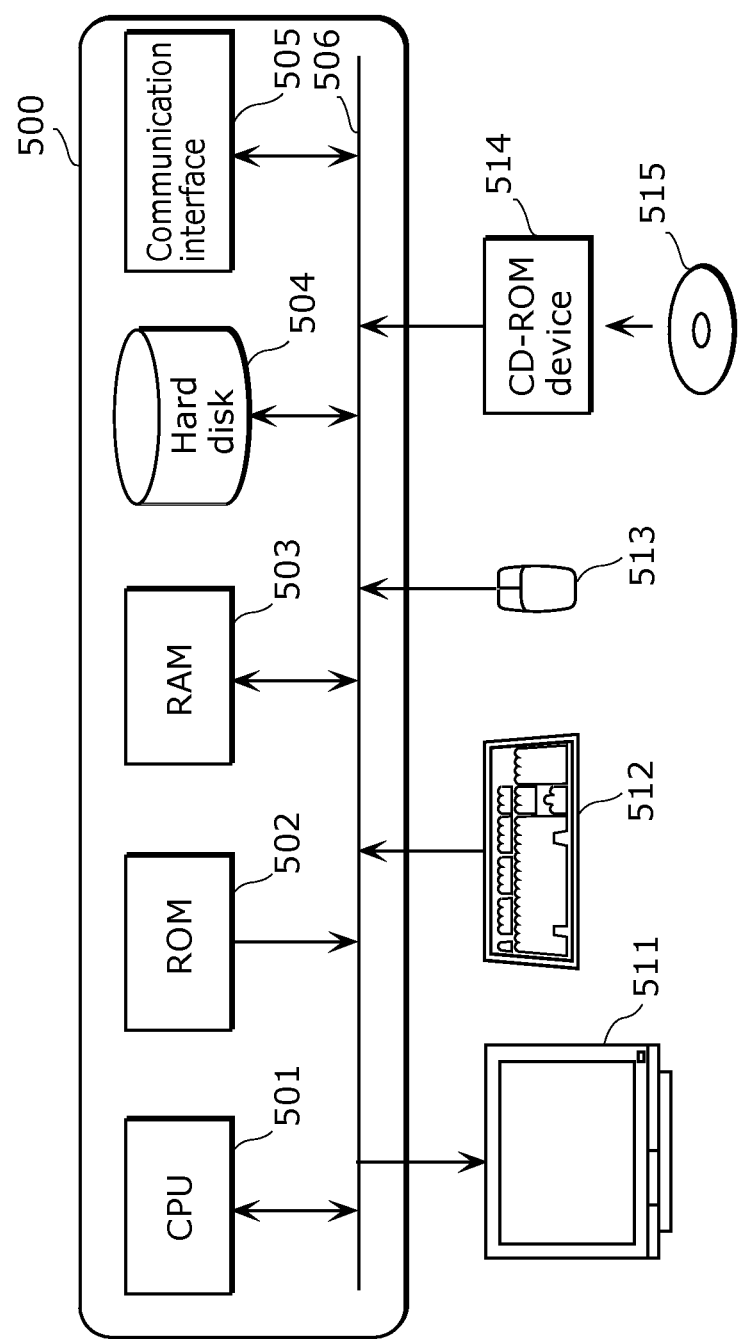
FIG. 12 illustrates an example of a hardware configuration of a computer.

The light physical constant estimation device 140 is achieved by, for example, a computer such as that illustrated in FIG. 12, and estimates distribution of light physical constants of the optical transmission medium 120. Details of the light physical constant estimation device 140 are described below with reference to FIG. 2.

<Configuration of Light Physical Constant Estimation Device 140>

Figure 2:
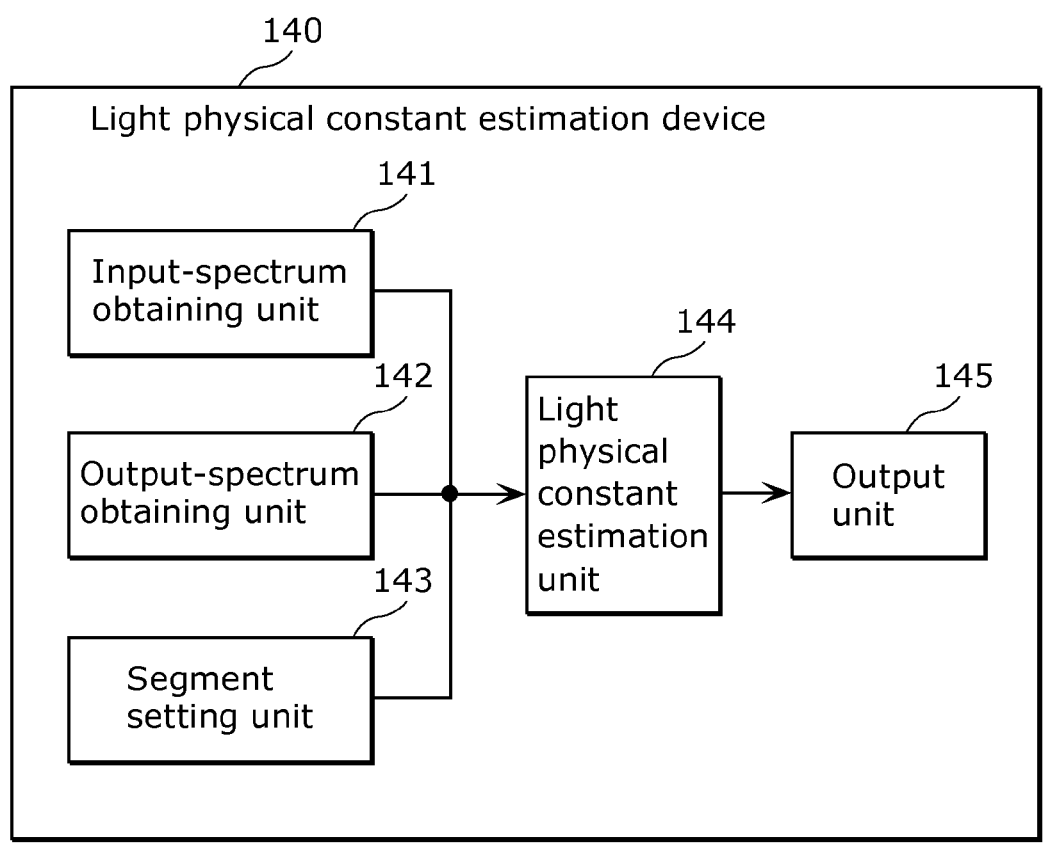
FIG. 2 is a block diagram illustrating a functional configuration of a light physical constant estimation device according to Embodiment 1.

FIG. 2 is a block diagram illustrating a functional configuration of the light physical constant estimation device 140 according to Embodiment 1. As illustrated in FIG. 2, the light physical constant estimation device 140 includes an input-spectrum obtaining unit 141, an output-spectrum obtaining unit 142, a segment setting unit 143, a light physical constant estimation unit 144, and an output unit 145.

The input-spectrum obtaining unit 141 obtains information indicating a power spectrum and a phase spectrum of an input optical signal. For example, the input-spectrum obtaining unit 141 obtains a power spectrum of an input optical signal by reading data of a power spectrum and a phase spectrum stored in storage or the like.

The power spectrum shows intensity of light of an optical signal for respective wavelengths thereof. The phase spectrum shows phases of an optical signal for respective wavelengths thereof.

It should be noted that the information indicating a power spectrum and a phase spectrum of an input optical signal does not always need to indicate the exact power spectrum and phase spectrum of the input optical signal. For example, the information indicating a power spectrum of an input optical signal may indicate an autocorrelation function of the input optical signal instead of the power spectrum of the input optical signal. This means that the information indicating a power spectrum and a phase spectrum of the input optical signal may be any information that can lead to the power spectrum and the phase spectrum of the input optical signal.

The output-spectrum obtaining unit 142 obtains, for each intensity of an input optical signal, a power spectrum of an output optical signal that is output after the input optical signal propagates within the optical transmission medium 120. Herein, the output-spectrum obtaining unit 142 obtains, for each intensity of an input optical signal, a measured power spectrum that is a power spectrum measured by the spectroscope 130.

The segment setting unit 143 sets a plurality of segments by virtually dividing the optical transmission medium 120 along the propagation direction. A segment in this embodiment corresponds to the first segment. It should be noted that the method for such division does not need to be particularly limited. For example, the segment setting unit 143 virtually divides the optical transmission medium 120 at regular intervals. When a position in which the light physical constant changes is already known, for example, the segment setting unit 143 may virtually divide the optical transmission medium 120 in such a way that the segments are separated at the position.

The light physical constant estimation unit 144 estimates light physical constants of the segments based on the result of a propagation simulation (corresponding to the first propagation simulation) that uses a model in which the input optical signal of each intensity propagates sequentially through the segments. This propagation simulation requires, as input, information indicating a power spectrum and a phase spectrum of the input optical signal of a plurality of intensities and the light physical constants of the segments, and outputs a power spectrum (a calculated power spectrum) of the output optical signal as a simulation result.

Specifically, the light physical constant estimation unit 144 searches for the light physical constants of the segments using an evaluation function of evaluating a difference between the power spectrum of the output optical signal that has been measured (the measured power spectrum) and the power spectrum of the output optical signal obtained as a result of the propagation simulation (the calculated power spectrum), to estimate the light physical constants of the segments.

In other words, the light physical constant estimation unit 144 calculates the power spectrum of the output optical signal (the calculated power spectrum) by performing, for each intensity of the input optical signal, a simulation for the input optical signal propagating within the optical transmission medium 120, assuming that each segment has a light physical constant. The light physical constant estimation unit 144 then repeats the propagation simulation with different light physical constants of the segments which are provided to the respective propagation simulations so that the per-intensity difference between the calculated power spectrum and the measured power spectrum is reduced. At this time, the light physical constant estimation unit 144 follows a predetermined algorithm, for example, to change the light physical constants of the segments which are provided to the propagation simulation.

The evaluation function is a function the value of which changes according to an amount of difference between the measured power spectrum and the calculated power spectrum. For example it may be possible to use, as the evaluation function, a function of evaluating how close a difference in each frequency component value between the measured power spectrum and the calculated power spectrum is to "0." In this case, a value indicating the difference may be a sum of absolute differences or a sum of squared differences of the frequency component values, for example. Furthermore, for example, it may be also possible to use, as the evaluation function, a function of evaluating how close a ratio of the frequency component values of the calculated power spectrum to those of the measured power spectrum is to "1."

The predetermined algorithm is for searching for an optimal solution of a given function or an approximate solution thereof.

Examples of the predetermined algorithm include simulated annealing, a conjugate direction method, a conjugate gradient method, a genetic algorithm, and others. It should be noted that the predetermined algorithm does not need to be limited to those algorithms, and may be any algorithm.

The output unit 145 outputs, as distribution of light physical constants within the optical transmission medium 120, light physical constants of the segments estimated by the light physical constant estimation unit 144. Specifically, the output unit 145 outputs data or signals representing the estimated light physical constants of the segments to a memory, a display device, or the like, for example.

<Processing Operations of Light Physical Constant Estimation Device 140>

Next, various operations of the light physical constant estimation device 140 configured as described above are described.

Figure 3:
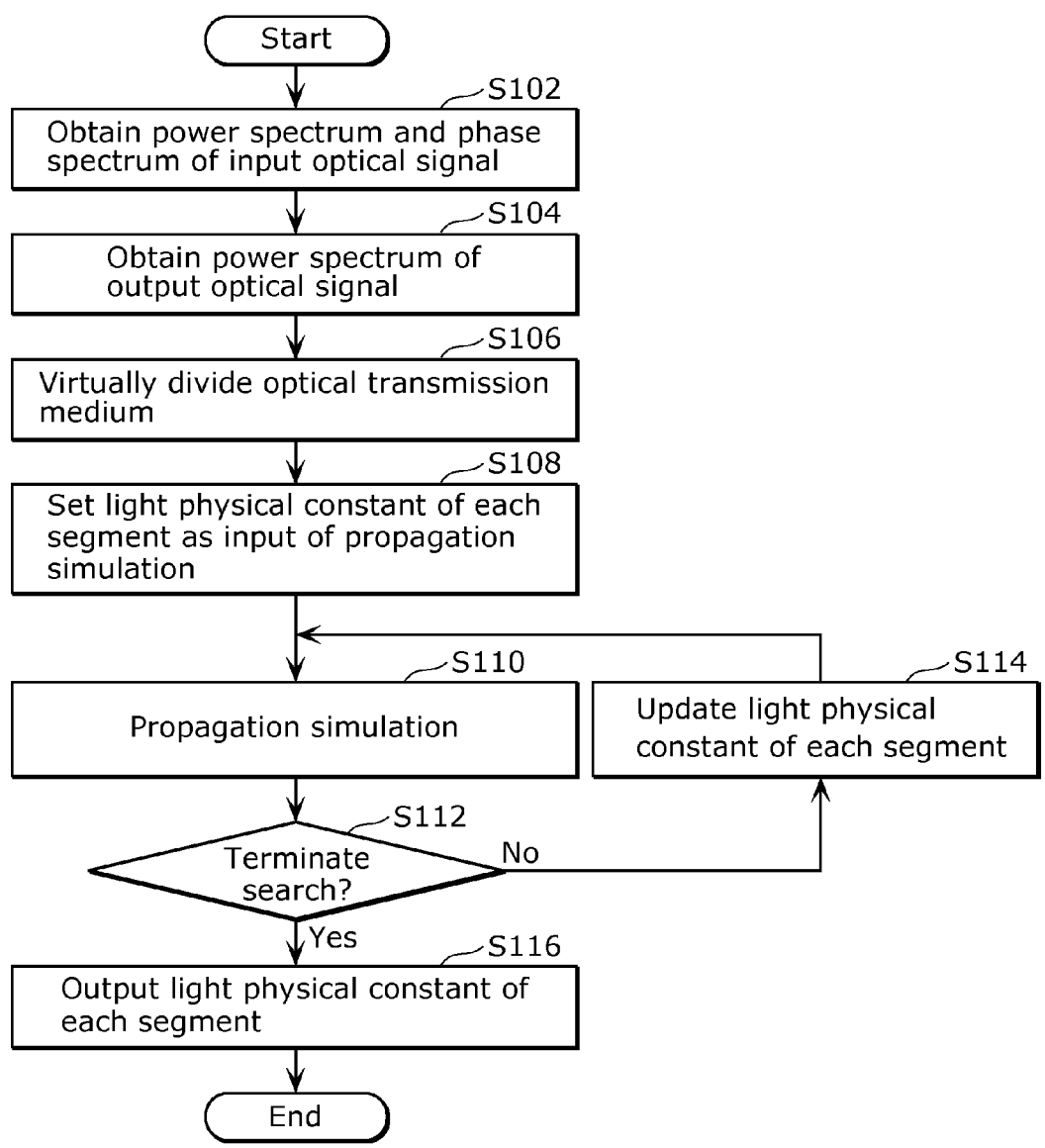
FIG. 3 is a flowchart showing processing operations of a light physical constant estimation device according to Embodiment 1.

FIG. 3 is a flowchart showing processing operations of the light physical constant estimation device 140 according to Embodiment 1.

First, the input-spectrum obtaining unit 141 obtains information indicating a power spectrum and a phase spectrum of an input optical signal generated by the optical signal generation device 100 (S102).

The spectroscope 130 measures a power spectrum of an output optical signal corresponding to the input optical signal of a plurality of intensities. The output-spectrum obtaining unit 142 then obtains the power spectrum of the output optical signal corresponding to the input optical signal of the plurality of intensities, measured by the spectroscope 130 (S104).

The segment setting unit 143 sets a plurality of segments by virtually dividing the optical transmission medium 120 along the propagation direction (S106).

The light physical constant estimation unit 144 sets an initial value of a light physical constant of each segment as input of a propagation simulation (S108). For example, the light physical constant estimation unit 144 sets an arbitrary light physical constant as the initial value. Moreover, the light physical constant estimation unit 144 further sets, as input of the propagation simulation, the information obtained in step S102 that indicates the power spectrum and the phase spectrum of the input optical signal of the plurality of intensities.

The light physical constant estimation unit 144 performs the propagation simulation, thereby calculating a power spectrum of the output optical signal (S110). Details of the propagation simulation will be described later.

The light physical constant estimation unit 144 determines whether or not the search for the light physical constant of each segment is to be terminated (S112). For example, when the value of the evaluation function (the evaluated value) is less than a threshold value, the light physical constant estimation unit 144 determines that the search for the light physical constant of each segment is to be terminated. Alternatively, for example, when a change ratio of the evaluated value is less than a threshold value, the light physical constant estimation unit 144 may determine that the search is to be terminated. Alternatively, for example, when the number of iterations of the propagation simulation has reached the upper limit, the light physical constant estimation unit 144 may determine that the search is to be terminated. Alternatively, the light physical constant estimation unit 144 may use these conditions in combination to determine whether or not the search is to be terminated.

When it is determined that the search is not to be terminated (No in S112), the light physical constant estimation unit 144 updates the light physical constant of each segment so that the difference between the calculated power spectrum and the measured power spectrum is reduced (S114). Specifically, the light physical constant estimation unit 144 sets a new light physical constant that is provided as input of the propagation simulation, according to the simulated annealing, for example. The processing in step S110 and step 112 is then repeated.

On the other hand, when it is determined that the search is to be terminated (Yes in S112), the output unit 145 outputs, as distribution of light physical constants within the optical transmission medium 120, light physical constants of the segments provided as input of the propagation simulation in which the evaluated value indicating the smallest difference has been obtained (S116).

As described above, the light physical constant estimation unit 144 searches for a light physical constant of each segment by repeating the propagation simulation with different light physical constants of the segments which are provided as input of the respective propagation simulations until it is determined that the search is to be terminated. Thus, the light physical constant estimation unit 144 searches for the optimal solution of the light physical constant of each segment or an approximate solution thereof, using the evaluation function of evaluating a per-intensity difference between the calculated power spectrum and the measured power spectrum.

<Propagation Simulation>

The following describes the split step Fourier method which is an example of the propagation simulation that uses the model in which the input optical signal of each intensity propagates sequentially through the segments. First, a dispersion effect and a nonlinear optical effect are described which exert an influence on an optical signal which propagates through the optical transmission medium 120.

The dispersion effect is a phenomenon (a response) that is linear with respect to the electric field of light, caused by a difference in interaction between light and a substance depending on a wavelength of the light. Due to the dispersion effect, the propagation velocity of an input optical signal changes according to a frequency thereof. Specifically, the phases of frequency components included in an input optical signal shift, and a time waveform of the input optical signal extends. A value indicating characteristics of this dispersion effect is the dispersion parameter.

The nonlinear optical effect is a phenomenon (a response) that is nonlinear with respect to the electric field of light, caused by interaction between a substance and light (for example, light having extremely strong intensity such as an ultrashort optical pulse). A value indicating characteristics of this nonlinear optical effect is the nonlinear optical constant. The nonlinear optical effect includes self-phase modulation, self-steepening, a Raman response, and others.

First, the self-phase modulation is described. A refractive index of an optical transmission medium such as an optical fiber slightly changes in proportion to the intensity of an optical signal which propagates therethrough, and thus phase modulation occurs in the optical signal itself. Phase modulation that occurs in this manner is called self-phase modulation.

Next, the self-steepening is described. The self-steepening is a phenomenon in which a symmetrical time waveform of an input optical signal becomes asymmetrical as the input optical signal propagates through the optical transmission medium, which shifts a peak backwards. The self-steepening is caused due to the dependence of a group velocity on intensity.

Lastly, the Raman response is described. When light is incident on a substance, the light is scattered into elastically scattered strong light (Rayleigh scattered light) having the same frequency as the incident light, and inelastically scattered very weak light having a slightly different frequency from that of the incident light. The inelastically scattered light is divided into Raman scattered light which is scattered by vibrating atoms and ions in a substance, and Brillouin scattered light which is scattered by a sound wave in a substance. Stimulated Raman scattering refers to a phenomenon in which Raman scattered light is strongly generated by induced emission if the intensity of incident light exceeds a certain threshold value in the Raman scattering. The Raman response refers to a phenomenon in which the induced Raman scattering causes transfer of energy from high to low frequency components of light in the optical transmission medium, which intensifies the low frequency components.

Expression (1) represents a propagation formula of the input optical signal which propagates through the optical transmission medium 120 under the influence of the dispersion effect and the nonlinear optical effect such as those described above.

[Math. 1]

$$\frac{dE}{dz} = (D + N)E \quad (1)$$

In the above expression, E denotes an electric field component of light, z denotes the length of the optical transmission medium 120 along the propagation direction, D denotes the dispersion effect and a loss, and N denotes the nonlinear optical effect. The following Expressions (2) and (3) represent D and N.

[Math. 2]

$$D = -\frac{i}{2}\beta_2 \frac{\partial^2}{\partial T^2} + \frac{1}{6}\beta_3 \frac{\partial^3}{\partial T^3} - \frac{i}{24}\beta_4 \frac{\partial^4}{\partial T^4} - \frac{\alpha}{2} \quad (2)$$

[Math. 3]

$$N = i\gamma\left(|E|^2 + \frac{2i}{\omega_0 E} \frac{\partial}{\partial T}(|E|^2 E) - T_R \frac{\partial |E|^2}{\partial T}\right) \quad (3)$$

In the above expressions, α, β, and γ denote light physical constants of the optical transmission medium 120. Specifically, α denotes a light physical constant for the loss of luminous intensity, β denotes a light physical constant for the dispersion effect of each degree (the dispersion parameter), and γ denotes a light physical constant for the nonlinear optical effect (the nonlinear optical constant). Here, T denotes time.

On the right-hand side of Expression (2), the first term represents second-order dispersion, the second term represents third-order dispersion, the third term represents fourth-order dispersion, and the last term represents the loss of intensity of light which propagates through the optical transmission medium 120. On the right-hand side of Expression (3), the first term represents the self-phase modulation, the second term represents the self-steepening, and the third term represents the Raman response.

Although Expression (2) represents the dispersion effect of the fourth or lower-order dispersion, the degree of the dispersion effect is not limited to this example. Thus, the dispersion parameter to be used in the propagation simulation is not limited to the second-order to fourth-order dispersion parameters. For example, the propagation simulation may be performed without using the third or higher-order dispersion parameter (that is, ignoring the third or higher-order dispersion effect) but using the second-order dispersion parameter. Alternatively, for example, the propagation simulation may be performed using the fifth or higher-order dispersion parameter.

Figure 4:
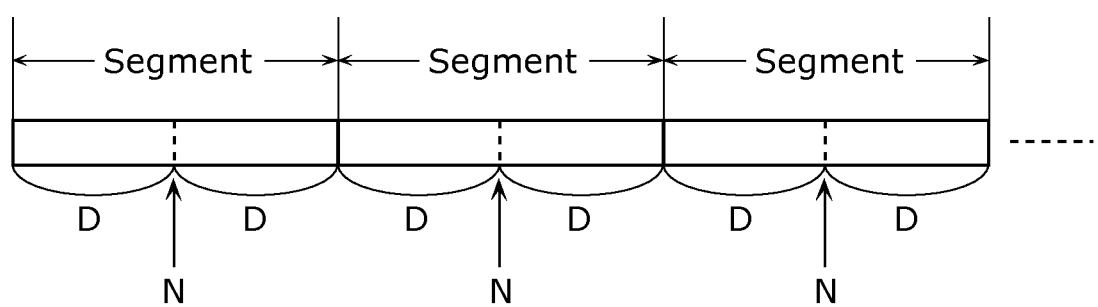
FIG. 4 is a diagram for describing the split step Fourier method in Embodiment 1.

This propagation formula includes a term depending on E itself. Accordingly, it is difficult to calculate the dispersion term (D) and the nonlinear term (N) simultaneously. Thus, according to the split step Fourier method, the optical transmission medium 120 is virtually divided into a plurality of steps (segments) along the propagation direction of an optical signal as illustrated in FIG. 4. The dispersion term and the nonlinear term are then sequentially calculated for each step, and thus an approximate solution of the optical signal which propagates through the optical transmission medium 120 can be determined.

To put it differently, in the propagation simulation, optical signal propagation calculation using the dispersion parameter (dispersion-term calculation) and optical signal propagation calculation using the nonlinear optical constant (nonlinear-term calculation) are sequentially performed for each segment. It should be noted that the dispersion-term calculation and the nonlinear-term calculation are performed in any sequence. Specifically, the dispersion-term calculation and the nonlinear-term calculation may be performed either in the stated sequence or in the reverse sequence.

The propagation simulation is not necessarily performed according to the split step Fourier method. For example, the propagation simulation may be performed according to the finite-difference time-domain (FDTD) method. In other words, it is possible to adopt any propagation simulation that uses the model in which the input optical signal of each intensity propagates sequentially through the segments.

<Experimental Results>

Next, the experimental results obtained by the system for measuring light physical constants according to this embodiment are described.

In an experiment, the optical signal generation device 100 generated, as the input optical signal, an optical pulse having a predetermined time waveform (power spectrum and phase spectrum).

As the intensity adjuster 110, a variable optical attenuator (VOA) was used. The intensity adjuster 110 changed the intensity of the input optical signal generated by the optical signal generation device 100, into four different intensities. The intensity adjuster 110 then output to the optical transmission medium 120 the input optical signal of the intensity that has been changed.

Figures 5A, 5B:
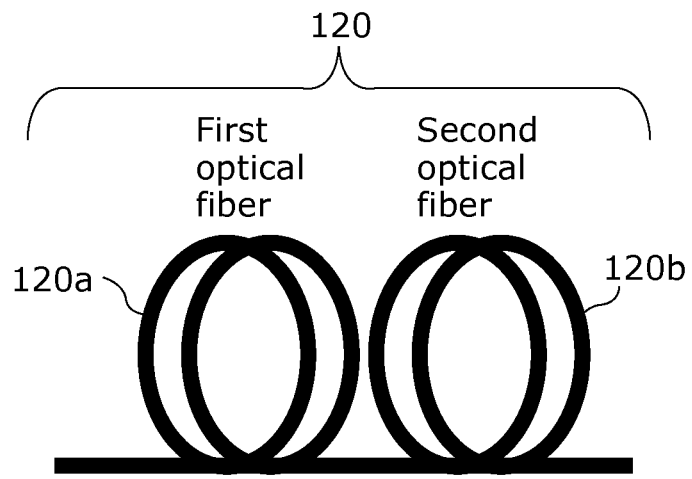
FIG. 5A is a diagram for describing an optical transmission medium used in an experiment according to Embodiment 1.
FIG. 5B is a diagram for describing an optical transmission medium used in an experiment according to Embodiment 1.
Figure 6A:
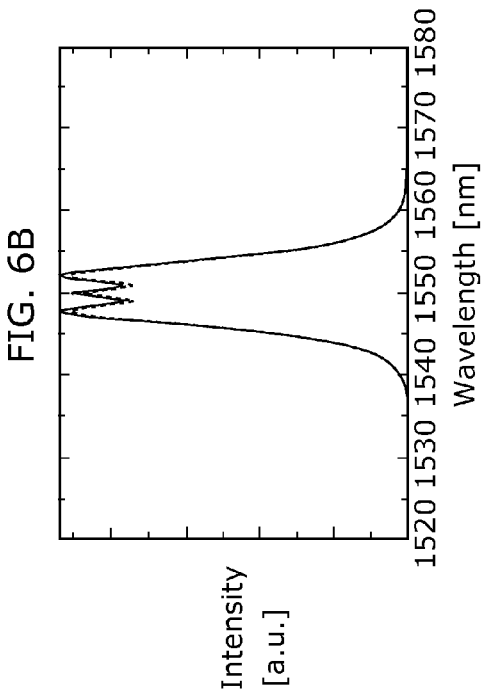
FIG. 6A is a graph showing an example of the experimental result about a difference between a measured power spectrum and a calculated power spectrum of an output optical signal in Embodiment 1.
Figure 6B:
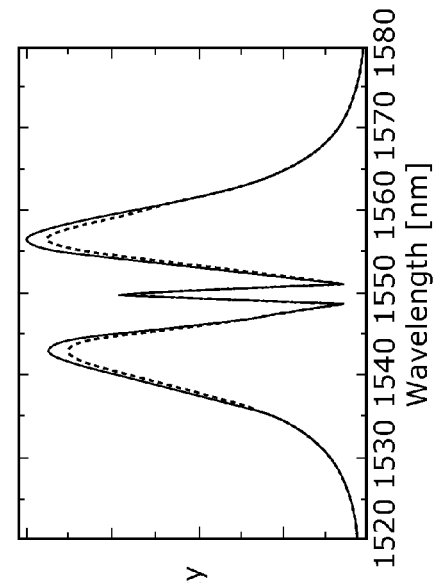
FIG. 6B is a graph showing an example of the experimental result about a difference between a measured power spectrum and a calculated power spectrum of an output optical signal in Embodiment 1.
Figure 6C:
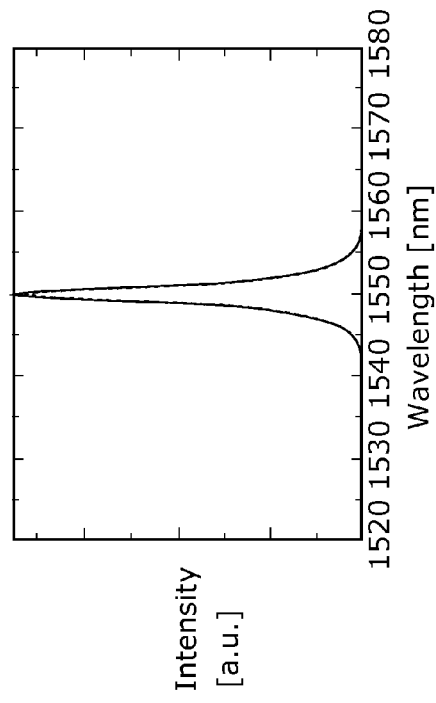
FIG. 6C is a graph showing an example of the experimental result about a difference between a measured power spectrum and a calculated power spectrum of an output optical signal in Embodiment 1.
Figure 6D:
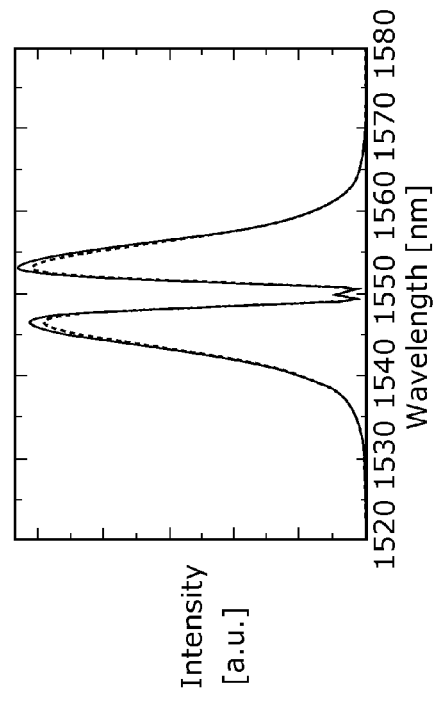
FIG. 6D is a graph showing an example of the experimental result about a difference between a measured power spectrum and a calculated power spectrum of an output optical signal in Embodiment 1.

As illustrated in FIG. 5A, the optical transmission medium 120 used in the present experiment is made up of two connected optical fibers having different light physical constants (the first optical fiber 120a and the second optical fiber 120b). As illustrated in FIG. 5B, each of the first optical fiber 120a and the second optical fiber 120b is five meters in length (L).

Each of the first optical fiber 120a and the second optical fiber 120b had a light physical constant shown in FIG. 5B (where D denotes a dispersion parameter, SI denotes a dispersion slope, and γ denotes a nonlinear optical constant).

In this experiment, the light physical constant of each of the four segments obtained by virtually dividing the optical transmission medium 120 at intervals of 2.5 meters was searched for, and thus distribution of light physical constants within the optical transmission medium 120 was estimated.

Each of FIG. 6A to FIG. 6D is a graph showing an example of the measured power spectrum and the calculated power spectrum of the output optical signal in Embodiment 1. FIG. 6A to FIG. 6D each show the measured power spectrum and the calculated power spectrum obtained in the propagation simulation upon completion of the search for the light physical constant.

In FIG. 6A to FIG. 6D, the horizontal axis represents a wavelength (nm), the vertical axis represents intensity (a.u.), the solid line represents a measured value of the power spectrum of the output optical signal, and the broken line represents a calculated value of the power spectrum of the output optical signal (a propagation simulation result).

Figures 7, 8:
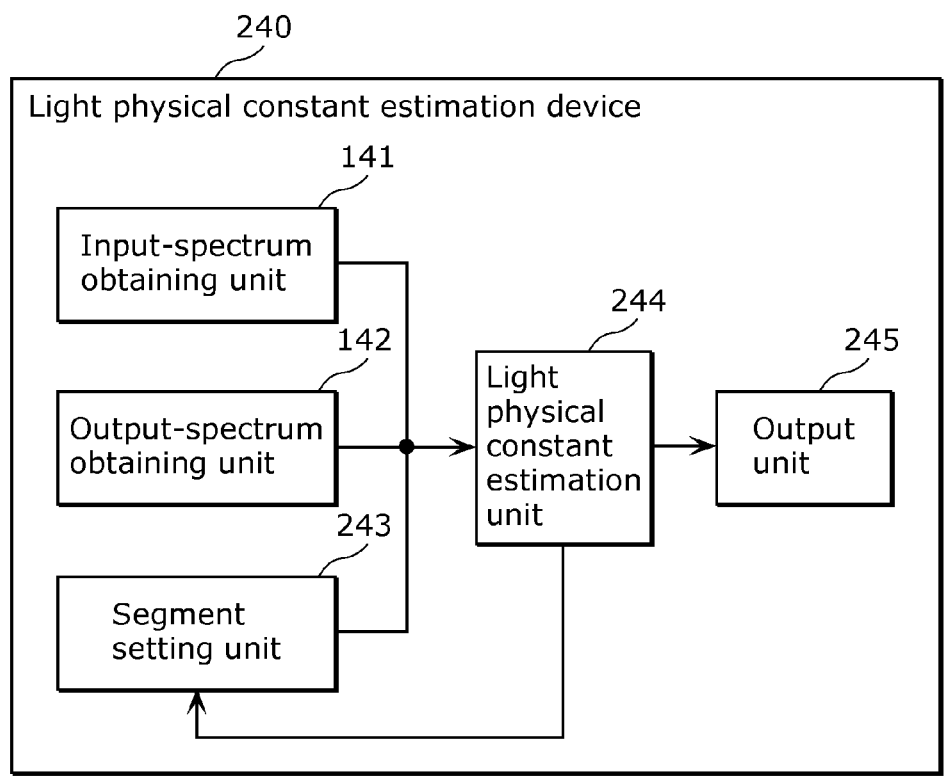
FIG. 7 is a table showing light physical constants of respective segments estimated by an experiment in Embodiment 1.
FIG. 8 is a block diagram illustrating a functional configuration of a light physical constant estimation device according to Embodiment 2.

FIG. 7 is a table showing the light physical constants of the segments estimated by the experiment in Embodiment 1. This means that FIG. 7 shows the light physical constant of each segment provided as input of the propagation simulation in which the power spectrum represented by the broken line in each of FIG. 6A to FIG. 6D is calculated. In this experiment, the optical transmission medium 120 was virtually divided at intervals of 2.5 meters.

As shown in FIG. 7, an appropriate solution of distribution of light physical constants within the optical transmission medium 120 illustrated in FIG. 5A and FIG. 5B was able to be obtained in this experiment. Specifically, in this experiment, an appropriate solution of distribution of light physical constants within the optical transmission medium 120 was able to be obtained using the power spectrum and the phase spectrum of the input optical signal of a plurality of intensities and the power spectrum of the output optical signal corresponding to the input optical signal of the plurality of intensities.

As described above, the light physical constant estimation device according to the present embodiment is capable of estimating distribution, in a propagation direction, of light physical constants within the optical transmission medium using the power spectrum of the output optical signal corresponding to the input optical signal of the plurality of intensities. Therefore, it is not necessary to use a special device to obtain distribution, in the propagation direction, of light physical constants within the optical transmission medium. This means that with a simple, easy-to-use system for measuring light physical constants (for example, a system including a variable optical attenuator and a spectroscope), it is possible to obtain distribution, in the propagation direction, of light physical constants within an optical transmission medium.

Thus, the light physical constant estimation device is capable of obtaining distribution of light physical constants without physically dividing an optical transmission medium, and therefore is useful, for example, for quality inspection for the optical transmission medium. When used for inspection for a submarine optical cable, the light physical constant estimation device is capable of estimating an abnormal portion of the optical cable.

Although the foregoing has described the example in which the optical transmission medium is equally divided into four segments in the propagation direction of light, the method of dividing the optical transmission medium is not limited to the above example. For example, the optical transmission medium may be unequally divided. In other words, the number of segments and the length of each segment may be arbitrary. For example, the number of segments and the length of each segment may be changed according to the intended use of the optical transmission medium. With a larger number of segments, distribution of light physical constants can be obtained with higher accuracy though the length of time for the search increases.

Embodiment 2

Next, Embodiment 2 is described.

The present embodiment is different from Embodiment 1 in that the segments are integrated during the search for distribution of light physical constants. The following describes a light physical constant estimation device according to the present embodiment, focusing on differences from Embodiment 1. A configuration of the system for measuring light physical constants according to the present embodiment is the same as that illustrated in FIG. 1, and therefore an illustration thereof is omitted.

<Configuration of Light Physical Constant Estimation Device 240>

FIG. 8 is a block diagram illustrating a functional configuration of the light physical constant estimation device 240 according to Embodiment 2. Constituent elements in FIG. 8 that have the same or similar functions as those in FIG. 2 are denoted by the same reference signs as the reference signs of those in FIG. 2, and descriptions thereof are omitted where appropriate.

As illustrated in FIG. 8, the light physical constant estimation device 240 includes the input-spectrum obtaining unit 141, the output-spectrum obtaining unit 142, a segment setting unit 243, a light physical constant estimation unit 244, and an output unit 245.

The segment setting unit 243 sets a plurality of segments by virtually dividing the optical transmission medium 120 along the propagation direction as with the segment setting unit 143 in Embodiment 1. The set segments are referred to below as the first segments.

Furthermore, the segment setting unit 243 sets a plurality of second segments by integrating adjacent first segments included in the plurality of first segments, based on the light physical constants of the plurality of first segments estimated by the later-described light physical constant estimation unit 244.

The light physical constant estimation unit 244 estimates light physical constants of the first segments based on the result of the first propagation simulation using a model in which the input optical signal of each intensity propagates sequentially through the first segments, as with the light physical constant estimation unit 144 in Embodiment 1. This first propagation simulation requires, as input, information indicating a power spectrum and a phase spectrum of the input optical signal of a plurality of intensities and the light physical constants of the first segments, and outputs a power spectrum (a calculated power spectrum) of the output optical signal as a simulation result.

Specifically, the light physical constant estimation unit 244 searches for the light physical constants of the first segments using an evaluation function of evaluating a difference between the power spectrum of the output optical signal that has been measured (the measured power spectrum) and the power spectrum of the output optical signal obtained as a result of the first propagation simulation (the calculated power spectrum), to estimate the light physical constants of the first segments.

Furthermore, the light physical constant estimation unit 244 estimates light physical constants of the second segments based on the result of the second propagation simulation using a model in which the input optical signal of each intensity propagates sequentially through the second segments. This second propagation simulation requires, as input, information indicating a power spectrum and a phase spectrum of the input optical signal of a plurality of intensities and the light physical constants of the second segments, and outputs a power spectrum (a calculated power spectrum) of the output optical signal as a simulation result.

Specifically, the light physical constant estimation unit 244 searches for the light physical constants of the second segments using an evaluation function of evaluating a difference between the power spectrum of the output optical signal that has been measured (the measured power spectrum) and the power spectrum of the output optical signal obtained as a result of the second propagation simulation (the calculated power spectrum), to estimate the light physical constants of the second segments.

The output unit 245 outputs, as distribution of light physical constants within the optical transmission medium 120, light physical constants of the second segments estimated by the light physical constant estimation unit 244.

<Processing Operations of Light Physical Constant Estimation Device 240>

Next, various operations of the light physical constant estimation device 240 configured as described above are described.

Figure 9:
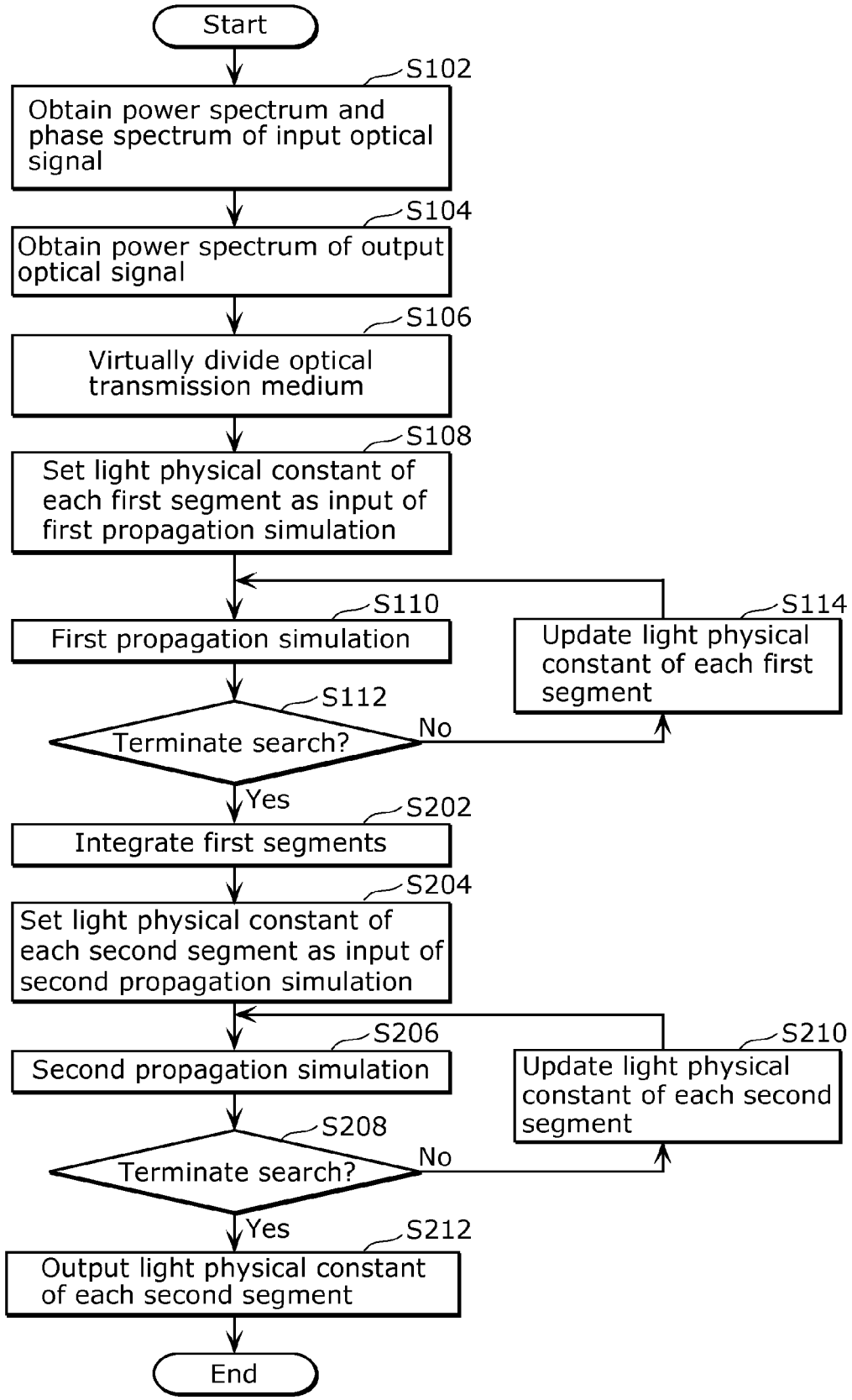
FIG. 9 is a flowchart showing processing operations of a light physical constant estimation device according to Embodiment 2.
Figure 10:
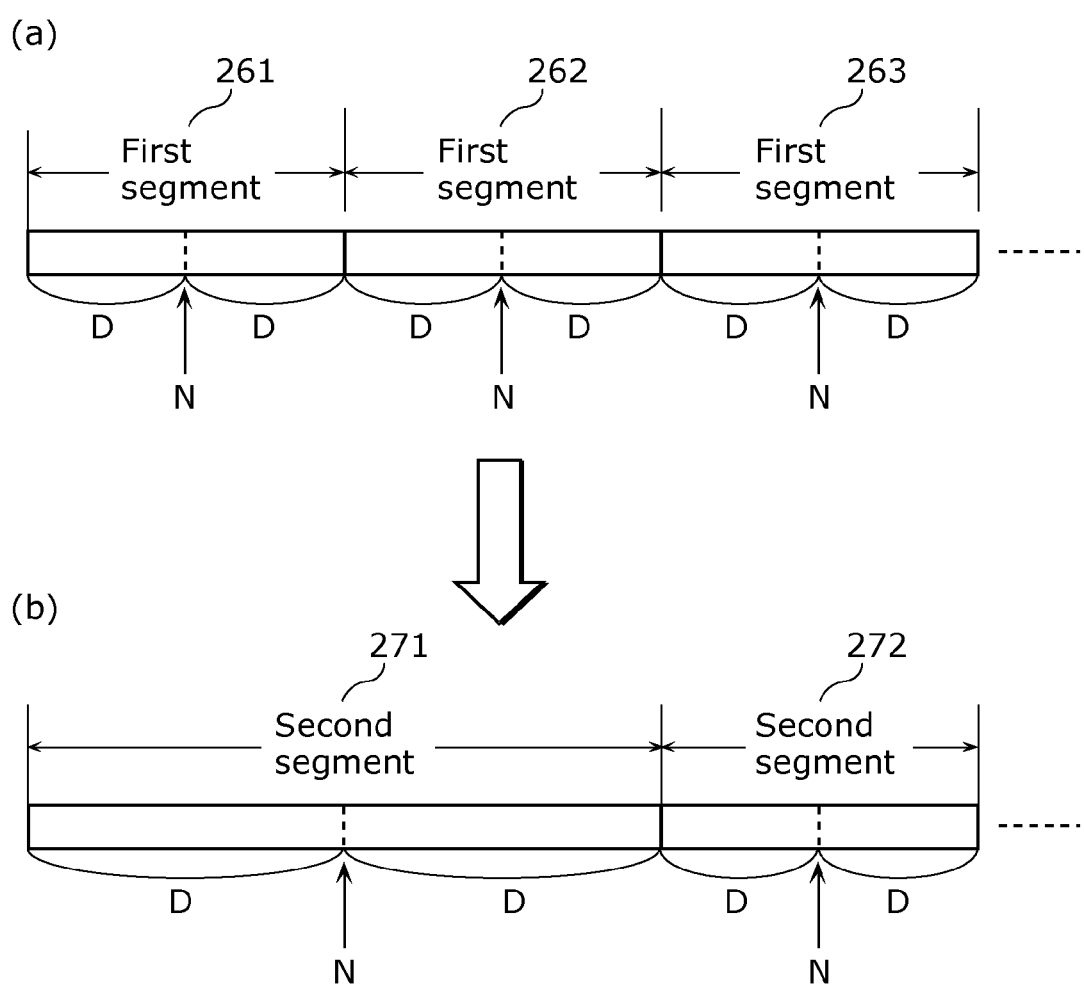
FIG. 10 is a diagram for describing segment integration in Embodiment 2.

FIG. 9 is a flowchart showing processing operations of the light physical constant estimation device 240 according to Embodiment 2. FIG. 10 is a diagram for describing segment integration in Embodiment 2. Steps in FIG. 9 that include the same or similar processing as those in FIG. 3 are denoted by the same reference signs as the reference signs of those in FIG. 3, and descriptions thereof are omitted where appropriate.

The light physical constant estimation device 240 estimates light physical constants of the first segments (step S102 to step S114) as does in Embodiment 1.

Subsequently, the segment setting unit 243 sets a plurality of second segments by integrating adjacent first segments included in the plurality of first segments, based on the estimated light physical constants of the first segments (S202). Specifically, the segment setting unit 243 determines, for example, whether or not the light physical constants of the adjacent first segments included in the plurality of first segments are similar. The segment setting unit 243 then integrates the adjacent first segments when it is determined that the light physical constants of the adjacent first segments are similar.

Details of this processing are described below with reference to FIG. 10. For example, assume that the segment setting unit 243 sets the first segments as illustrated in (a) of FIG. 10.

At this time, the segment setting unit 243 determines whether or not the light physical constant of a first segment 261 and the light physical constant of a first segment 262 are similar, and further determines whether or not the light physical constant of the first segment 262 and the light physical constant of a first segment 263 are similar. Specifically, the segment setting unit 243 compares, with a threshold value, a value indicating a difference in the light physical constant between the segments (for example, an absolute value of the difference, a ratio of the light physical constants, or the like), for example, to determine whether or not the light physical constants of the segments are similar.

When it is determined that the light physical constants of the first segments 261 and 262 are similar and it is determined that the light physical constants of the first segments 262 and 263 are not similar, the segment setting unit 243 integrates the first segments 261 and 262, but do not integrate the first segments 262 and 263. As a result, second segments 271 and 272 are set as illustrated in (b) of FIG. 10.

Refer back to the flowchart in FIG. 9. The light physical constant estimation unit 244 sets initial values of the light physical constants of the second segments as input of the second propagation simulation (S204). For example, the light physical constant estimation unit 244 sets the initial values of the light physical constants of the second segments using the estimated light physical constants of the first segments. Specifically, the light physical constant estimation unit 244 sets, for each of the second segments, the initial value of the light physical constant of the second segment using the light physical constant of one or more first segments that correspond to the second segment.

More specifically, when a plurality of second segments are set as illustrated in FIG. 10, for example, the light physical constant estimation unit 244 sets, as an initial value of the light physical constant of the second segment 271, a statistically representative value (for example, the mean value or the median) of the light physical constants of the first segments 261 and 262 corresponding to the second segment 271.

With this, the light physical constant estimation unit 244 is capable of reducing a decrease in the evaluation function (an increase in the difference between the measured power spectrum and the calculated power spectrum) at the time of starting the search in the second propagation simulation. Thus, the light physical constant estimation unit 244 is capable of lessening the processing time or the processing load.

The light physical constant estimation unit 244 performs the second propagation simulation, thereby calculating a power spectrum of the output optical signal (S206). The second propagation simulation is the same as the first propagation simulation except that instead of the first segment, the second segment is used in the second propagation simulation.

The light physical constant estimation unit 244 determines whether or not the search for the light physical constant of each of the second segments is to be terminated (S208). Specifically, as in the case of the determination in step S112, the light physical constant estimation unit 244 determines whether or not the search for the light physical constant of each of the second segments is to be terminated, based on at least one of the evaluation function and the number of iterations, for example.

At this time, the condition to terminate the search in step S208 may be more stringent than the condition to terminate the search in step S112. This makes it possible to enhance the accuracy of estimating the light physical constant in the second propagation simulation, as well as reducing the number of times that the first propagation simulation, in which the processing load is high due to the fact of having a large number of segments, is performed.

When it is determined that the search is not to be terminated (No in S208), the light physical constant estimation unit 244 updates the light physical constant of each of the second segments so that the difference between the calculated power spectrum and the measured power spectrum is reduced as in step S114 (S210).

On the other hand, when it is determined that the search is to be terminated (Yes in S208), the output unit 245 outputs, as distribution of light physical constants within the optical transmission medium 120, light physical constants of the second segments provided as input of the second propagation simulation in which the evaluated value indicating the smallest difference has been obtained (S212).

Figure 11:
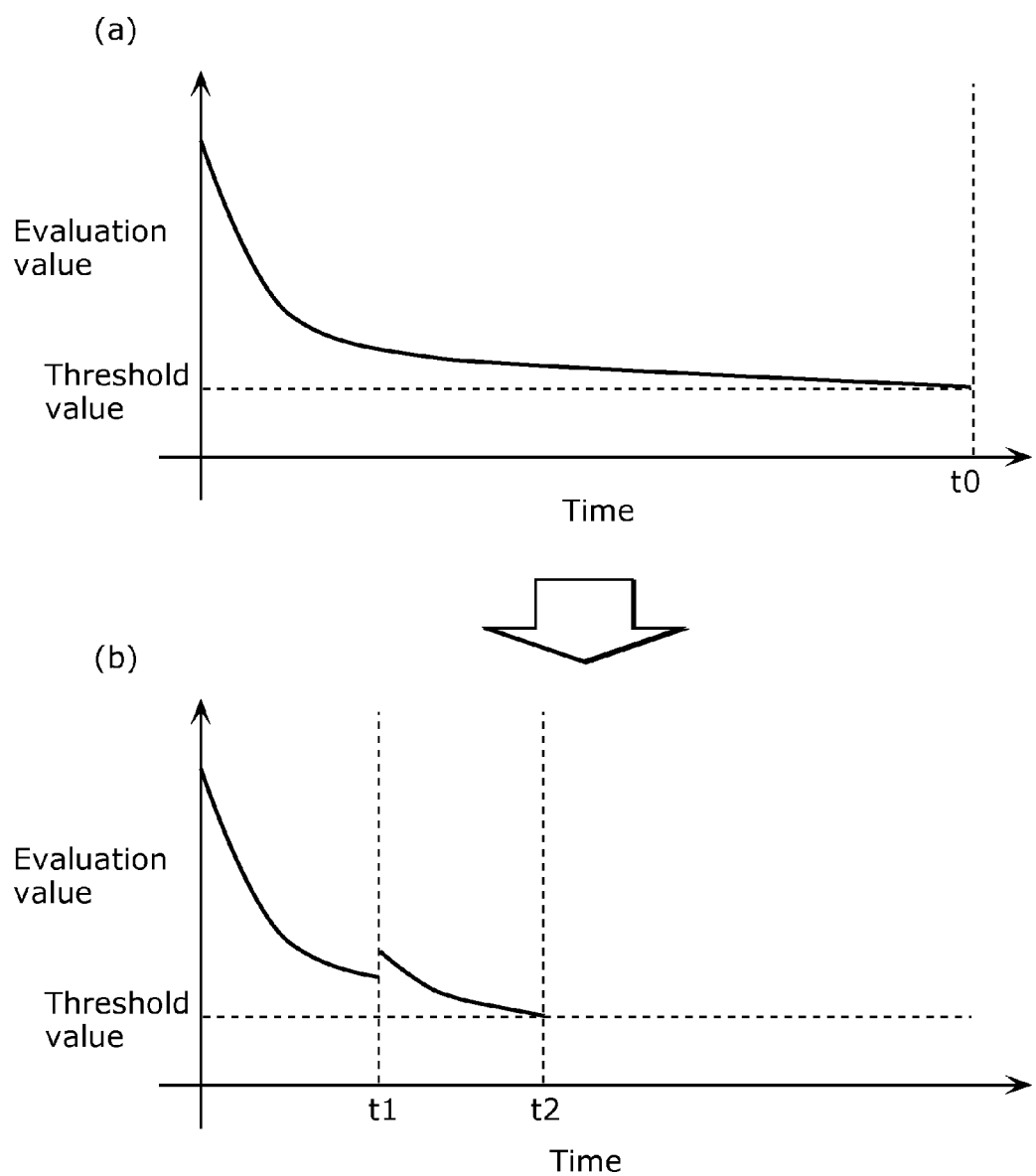
FIG. 11 is a diagram for describing an advantageous effect produced by a light physical constant estimation device according to Embodiment 2.

FIG. 11 is a diagram for describing an advantageous effect produced by a light physical constant estimation device according to Embodiment 2. In FIG. 11, (a) shows temporal transition of evaluation values obtained when the first propagation simulation using the first segments is repeated until the evaluation value becomes less than the threshold value. Furthermore, in FIG. 11, (b) shows temporal transition of evaluation values obtained when the first propagation simulation is repeated, and then the second propagation simulation using the second segments obtained by integrating the first segments is repeated. In this case, the evaluation value is a sum of absolute differences between the measured power spectrum and the calculated power spectrum for the respective frequency component values.

As shown in (a) of FIG. 11, the time at which the evaluation value becomes less than or equal to the threshold value in the first propagation simulation is t0. In this regard, when the first segments are integrated and the second propagation simulation starts at time t1, the evaluation value becomes less than or equal to the threshold value at time t2.

In the second propagation simulation, the number of segments is smaller, and therefore the processing time necessary for one simulation is shorter, as compared to the first propagation simulation. Thus, as shown in FIG. 11, the processing time necessary to satisfy the final termination condition (until the evaluation value becomes less than or equal to the threshold value) can be reduced.

When the number of first segments is increased to the contrary, it is possible to reduce an increase in the processing time and also reduce a decrease in the estimation accuracy that is caused due to a mismatch between a boundary position of the first segments and an actual position at which the light physical constant changes.

As described above, the light physical constant estimation device 240 according to the present embodiment is capable of searching for distribution of light physical constants within the optical transmission medium using the second segments obtained by integrating the first segments. Therefore, a position at which the light physical constant changes in the optical transmission medium can be appropriately set according to the result of the first propagation simulation, making it possible to enhance the accuracy of estimating distribution of the light physical constants. Furthermore, in the light physical constant estimation device 240, the plurality of segments that are estimated to have a uniform light physical constant (the first segments) can be integrated into one segment (the second segment) for the propagation simulation, with the result that the processing time or the processing load in the propagation simulation can be lessened. For example, the light physical constant estimation device 240 is capable of reducing the number of times that the first propagation simulation, in which the processing load is high due to the fact of having a large number of segments, is performed, by setting the condition to terminate the search in the second propagation simulation to be more stringent than the condition to terminate the search in the first propagation simulation.

Although the above describes a light physical constant estimation device and a light physical constant measurement system according to an aspect of the present invention, based on embodiments, the present invention is not limited to the embodiments. The scope of the present invention includes various modifications to the embodiments that may be conceived by those skilled in the art or embodiments achieved by combining constituent elements in different embodiments, as long as those modifications and embodiments do not depart from the essence of the present invention.

For example, although the above embodiments describe the examples in which a nonlinear optical constant and a dispersion parameter of the optical transmission medium are estimated, it is not always necessary to estimate the nonlinear optical constant and the dispersion parameter. For example, when the dispersion parameter is known, only the nonlinear optical constant may be estimated.

Furthermore, although the integration of segments is performed only once in Embodiment 2 described above, the integration of segments may be performed two times or more. For example, after the search for a light physical constant in the second propagation simulation is terminated, a plurality of second segments may be integrated to set a plurality of third segments.

Furthermore, the present invention can be implemented as a light physical constant measurement method in which the steps that are performed by characteristic constituent elements of such a light physical constant estimation device are executed. Furthermore, the present invention can be implemented as a program for causing a computer such as that illustrated in FIG. 12 to execute the steps that are performed by the characteristic constituent elements of the light physical constant estimation device. Such a program can be distributed via a recording medium such as CD-ROM and a transmission medium such as the Internet.

FIG. 12 illustrates an example of a hardware configuration of a computer. A program for implementing the light physical constant estimation device using a computer is stored in, for example, a CD-ROM 515 which is a transitory, computer-readable medium, and is read via a CD-ROM device 514. Furthermore, for example, a program for implementing the light physical constant estimation device using a computer is transmitted via a wired or wireless network, or broadcast.

A computer 500 includes a central processing unit (CPU) 501, read only memory (ROM) 502, random access memory (RAM) 503, a hard disk 504, a communication interface 505, and others.

The CPU 501 executes a program read via the CD-ROM device 514, or a program received via the communication interface 505. Specifically, the CPU 501 expands the program read via the CD-ROM device 514 or the program received via the communication interface 505 in the RAM 503. Then, the CPU 501 executes coded commands in the program expanded in the RAM 503.

The ROM 502 is read-only memory which stores programs and data necessary for the computer 500 to operate. The RAM 503 is used as a work area when the CPU 501 executes a program. Specifically, the RAM 503 temporarily stores data such as parameters for program execution, for example. The hard disk 504 stores programs, data, and others.

The communication interface 505 communicates with other computers via a network. A bus 506 connects the CPU 501, the ROM 502, the RAM 503, the hard disk 504, the communication interface 505, a display 511, a keyboard 512, a mouse 513, and the CD-ROM device 514.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which implements the light physical constant estimation device according to the above embodiments and the like is a program as will be described below.

Specifically, this program causes a computer to execute: obtaining information indicating a power spectrum and a phase spectrum of an input optical signal of a plurality of intensities; obtaining, for each of the plurality of intensities of the input optical signal, a measured power spectrum of an output optical signal that is output after the input optical signal of the intensity propagates within the optical transmission medium; virtually dividing the optical transmission medium along a propagation direction to set a plurality of first segments; estimating light physical constants of the plurality of first segments based on a result of a first propagation simulation that uses a model in which the input optical signal of each of the plurality of intensities propagates sequentially through the plurality of first segments; and outputting the estimated light physical constants of the plurality of first segments as the distribution of the light physical constants within the optical transmission medium. At this time, the first propagation simulation requires, as input, the obtained information indicating the power spectrum and the phase spectrum of the input optical signal of the plurality of intensities, and light physical constants of the plurality of first segments, and outputs a power spectrum of the output optical signal as a simulation result. Furthermore, in the estimating of light physical constants of the plurality of first segments, the light physical constants of the plurality of first segments are searched for using an evaluation function of evaluating a difference between the measured power spectrum of the output optical signal and the power spectrum of the output optical signal obtained as a result of the first propagation simulation, to estimate the light physical constants of the plurality of first segments.

INDUSTRIAL APPLICABILITY

The present invention is useful as a light physical constant estimation device and a light physical constant measurement system that are capable of measuring distribution of light physical constants within an optical transmission medium.

REFERENCE SIGNS LIST

100 Optical signal generation device
110 Intensity adjuster
120 Optical transmission medium
120a First optical fiber
120b Second optical fiber
130 Spectroscope
140, 240 Light physical constant estimation device
141 Input-spectrum obtaining unit
142 Output-spectrum obtaining unit
143, 243 Segment setting unit
144, 244 Light physical constant estimation unit
145, 245 Output unit

The invention claimed is:

1. A light physical constant measurement method for measuring distribution of light physical constants within an optical transmission medium, the light physical constant measurement method comprising:
obtaining information indicating a power spectrum and a phase spectrum of an input optical signal of a plurality of intensities;
measuring, for each of the plurality of intensities of the input optical signal, a power spectrum of an output optical signal that is output after the input optical signal of the plurality of intensities propagates within the optical transmission medium;
virtually dividing the optical transmission medium along a propagation direction to set a plurality of first segments;
estimating light physical constants of the plurality of first segments based on a result of a first propagation simulation that uses a model in which the input optical signal of each of the plurality of intensities propagates sequentially through the plurality of first segments;
combining adjacent first segments included in the plurality of first segments, based on the estimated light physical constants of the plurality of first segments, to set a plurality of second segments;

estimating light physical constants of the plurality of second segments based on a result of a second propagation simulation that uses a model in which the input optical signal of each of the plurality of intensities propagates sequentially through the plurality of second segments; and outputting the estimated light physical constants of the plurality of second segments as the distribution of the light physical constants within the optical transmission medium, wherein the first propagation simulation requires, as input, the obtained information indicating the power spectrum and the phase spectrum of the input optical signal of the plurality of intensities, and the light physical constants of the plurality of first segments, and outputs a power spectrum of the output optical signal as a simulation result, in the estimating of light physical constants of the plurality of first segments, the light physical constants of the plurality of first segments are searched for using an evaluation function of evaluating a difference between the measured power spectrum of the output optical signal and the power spectrum of the output optical signal obtained as the result of the first propagation simulation, to estimate the light physical constants of the plurality of first segments without using information indicating a phase spectrum of the output optical signal, the second propagation simulation requires, as input, the obtained information indicating the power spectrum and the phase spectrum of the input optical signal of the plurality of intensities, and the light physical constants of the plurality of second segments, and outputs a power spectrum of the output optical signal as a simulation result, initial values of the light physical constants of the plurality of second segments are set in the second propagation simulation using the estimated light physical constants of the plurality of first segments, in the estimating of light physical constants of the plurality of second segments, the light physical constants of the plurality of second segments are searched for using an evaluation function of evaluating a difference between the measured power spectrum of the output optical signal and the power spectrum of the output optical signal obtained as the result of the second propagation simulation, to estimate the light physical constants of the plurality of second segments, and each of the light physical constants of the plurality of first segments and the light physical constants of the plurality of second segments includes a dispersion parameter and a nonlinear optical constant.

2. The light physical constant measurement method according to claim 1, wherein in the combining, whether or not light physical constants of the adjacent first segments included in the plurality of first segments are similar is determined, and the adjacent first segments are combined when it is determined that the light physical constants of the adjacent first segments are similar.

3. The light physical constant measurement method according to claim 1, wherein in the estimating of light physical constants of the plurality of second segments, the initial values of the light physical constants of the plurality of second segments are provided as the input to the second propagation simulation.

4. The light physical constant measurement method according to claim 1, wherein the optical transmission medium is an optical fiber.

5. The light physical constant measurement method according to claim 1, wherein
in the first propagation simulation, optical signal propagation calculation using the dispersion parameter of the light physical constants of the plurality of first segments and optical signal propagation calculation using the nonlinear optical constant of the light physical constants of the plurality of first segments are sequentially performed for each of the plurality of first segments.

6. A light physical constant estimation device which estimates distribution of light physical constants within an optical transmission medium, the light physical constant estimation device comprising:

a processor; and a non-transitory computer-readable recording medium having stored thereon executable instructions, which when executed by the processor, cause the light physical constant estimation device to:

obtain information indicating a power spectrum and a phase spectrum of an input optical signal of a plurality of intensities;

obtain, for each of the plurality of intensities of the input optical signal, a measured power spectrum of an output optical signal that is output after the input optical signal of the plurality of intensities propagates within the optical transmission medium;

set a plurality of first segments by virtually dividing the optical transmission medium along a propagation direction;

estimate light physical constants of the plurality of first segments based on a result of a first propagation simulation that uses a model in which the input optical signal of each of the plurality of intensities propagates sequentially through the plurality of first segments;

combine adjacent first segments included in the plurality of first segments, based on the estimated light physical constants of the plurality of first segments, to set a plurality of second segments;

estimate light physical constants of the plurality of second segments based on a result of a second propagation simulation that uses a model in which the input optical signal of each of the plurality of intensities propagates sequentially through the plurality of second segments; and output the estimated light physical constants of the plurality of second segments as the distribution of the light physical constants within the optical transmission medium, wherein the first propagation simulation requires, as input, the obtained information indicating the power spectrum and the phase spectrum of the input optical signal of the plurality of intensities, and the light physical constants of the plurality of first segments, and outputs a power spectrum of the output optical signal as a simulation result, the executable instructions, when executed by the processor, further cause the light physical constant estimation device to search for the light physical constants of the plurality of first segments using an evaluation function of evaluating a difference between the measured power spectrum of the output optical signal and the power spectrum of the output optical signal obtained as the result of the first propagation simulation, to estimate the light physical constants of the plurality of first segments without using information indicating a phase spectrum of the output optical signal, the second propagation simulation requires, as input, the obtained information indicating the power spectrum and the phase spectrum of the input optical signal of the plurality of intensities, and the light physical constants of the plurality of second segments, and outputs a power spectrum of the output optical signal as a simulation result, initial values of the light physical constants of the plurality of second segments are set in the second propagation simulation using the estimated light physical constants of the plurality of first segments, the executable instructions, when executed by the processor, further cause the light physical constant estimation device to search for the light physical constants of the plurality of second segments using an evaluation function of evaluating a difference between the measured power spectrum of the output optical signal and the power spectrum of the output optical signal obtained as the result of the second propagation simulation, to estimate the light physical constants of the plurality of second segments, and each of the light physical constants of the plurality of first segments and the light physical constants of the plurality of second segments includes a dispersion parameter and a nonlinear optical constant.

7. A non-transitory computer-readable recording medium storing a program for estimating distribution of light physical constants within an optical transmission medium, the program causing a computer to execute:

obtaining information indicating a power spectrum and a phase spectrum of an input optical signal of a plurality of intensities;

obtaining, for each of the plurality of intensities of the input optical signal, a measured power spectrum of an output optical signal that is output after the input optical signal of the plurality of intensities propagates within the optical transmission medium;

virtually dividing the optical transmission medium along a propagation direction to set a plurality of first segments;

estimating light physical constants of the plurality of first segments based on a result of a first propagation simulation that uses a model in which the input optical signal of each of the plurality of intensities propagates sequentially through the plurality of first segments;

combining adjacent first segments included in the plurality of first segments, based on the estimated light physical constants of the plurality of first segments, to set a plurality of second segments;

estimating light physical constants of the plurality of second segments based on a result of a second propagation simulation that uses a model in which the input optical signal of each of the plurality of intensities propagates sequentially through the plurality of second segments; and outputting the estimated light physical constants of the plurality of second segments as the distribution of the light physical constants within the optical transmission medium, wherein the first propagation simulation requires, as input, the obtained information indicating the power spectrum and the phase spectrum of the input optical signal of the plurality of intensities, and the light physical constants of the plurality of first segments, and outputs a power spectrum of the output optical signal as a simulation result, in the estimating of light physical constants of the plurality of first segments, the light physical constants of the plurality of first segments are searched for using an evaluation function of evaluating a difference between the measured power spectrum of the output optical signal and the power spectrum of the output optical signal obtained as the result of the first propagation simulation, to estimate the light physical constants of the plurality of first segments without using information indicating a phase spectrum of the output optical signal, the second propagation simulation requires, as input, the obtained information indicating the power spectrum and the phase spectrum of the input optical signal of the plurality of intensities, and the light physical constants of the plurality of second segments, and outputs a power spectrum of the output optical signal as a simulation result, initial values of the light physical constants of the plurality of second segments are set in the second propagation simulation using the estimated light physical constants of the plurality of first segments, in the estimating of light physical constants of the plurality of second segments, the light physical constants of the plurality of second segments are searched for using an evaluation function of evaluating a difference between the measured power spectrum of the output optical signal and the power spectrum of the output optical signal obtained as the result of the second propagation simulation, to estimate the light physical constants of the plurality of second segments, and each of the light physical constants of the plurality of first segments and the light physical constants of the plurality of second segments includes a dispersion parameter and a nonlinear optical constant.

* * * * *